United States Patent
Guedalia et al.

(10) Patent No.: US 9,462,456 B2
(45) Date of Patent: Oct. 4, 2016

(54) METHOD AND APPARATUS FOR CREATING A TIME-SENSITIVE GRAMMAR

(71) Applicant: QUALCOMM Incorporated, San Diego, CA (US)

(72) Inventors: Isaac David Guedalia, Beit Shemesh (IL); Adam Schwartz, Beit-Shemesh (IL); Sarah Glickfield, Jerusalem (IL)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 14/547,654

(22) Filed: Nov. 19, 2014

(65) Prior Publication Data

US 2016/0142905 A1 May 19, 2016

(51) Int. Cl.
| | | |
|---|---|---|
| G10L 15/04 | (2013.01) | |
| G06F 17/27 | (2006.01) | |
| G06F 17/21 | (2006.01) | |
| H04W 8/20 | (2009.01) | |
| G06F 17/18 | (2006.01) | |
| G06Q 30/02 | (2012.01) | |

(52) U.S. Cl.
CPC ............. *H04W 8/205* (2013.01); *G06F 17/18* (2013.01); *G06Q 30/02* (2013.01)

(58) Field of Classification Search
None
See application file for complete search history.

(56) References Cited

U.S. PATENT DOCUMENTS

| | | | |
|---|---|---|---|
| 5,208,897 A | 5/1993 | Hutchins | |
| 7,363,577 B2 | 4/2008 | Kinser et al. | |
| 8,248,981 B2 * | 8/2012 | Warner | H04B 1/713 370/311 |
| 8,249,871 B2 | 8/2012 | Mukerjee | |
| 2006/0085788 A1 | 4/2006 | Amir et al. | |
| 2006/0198608 A1 * | 9/2006 | Girardi | G06F 17/30793 386/231 |
| 2012/0224711 A1 | 9/2012 | Kim et al. | |
| 2013/0211825 A1 * | 8/2013 | Tseng | G06F 17/2735 704/10 |
| 2013/0273976 A1 * | 10/2013 | Rao | H04L 12/1822 455/563 |
| 2014/0274042 A1 | 9/2014 | Teague et al. | |

FOREIGN PATENT DOCUMENTS

| | | |
|---|---|---|
| GB | 2107100 A | 4/1983 |
| GB | 2368498 A | 5/2002 |

OTHER PUBLICATIONS

Fitch W.T., et al., "Artificial grammar learning meets formal language theory: an overview," Philosophical Transactions of the Royal Society B, 2012, vol. 367 (1598), pp. 1933-1955.

(Continued)

*Primary Examiner* — Satwant Singh
(74) *Attorney, Agent, or Firm* — Muncy, Geissler, Olds & Lowe, P.C.

(57) ABSTRACT

The disclosure relates to creating a time-sensitive grammar. A device receives a plurality of data points, identifies a plurality of time gaps associated with the plurality of data points, each of the plurality of time gaps representing a dwell time or a frequency of occurrence of a data point of the plurality of data points, generates a generic time factor representing a multiple of the plurality of time gaps, and combines the generic time factor with the plurality of data points to create a time-sensitive sequence of data points. The generic time factor may be inserted into the time-sensitive sequence a number of times representing the dwell time or the frequency of occurrence of a corresponding data point of the plurality of data points.

30 Claims, 8 Drawing Sheets

(56) References Cited

OTHER PUBLICATIONS

Lakshmanan G.T., et al., "Knowledge Discovery in the Blogosphere," Social Computing in the Blogosphere, IEEE Internet Computing, Published by the IEEE Computer Society, 2010, pp. 24-32.

International Search Report and Written Opinion—PCT/US2015/054847—ISA/EPO—Dec. 22, 2015.

* cited by examiner

METHOD AND APPARATUS FOR CREATING A TIME-SENSITIVE GRAMMAR

BACKGROUND

1. Field of the Disclosure

Embodiments of the disclosure relate to creating a time-sensitive grammar.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long-Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

User devices generally track information related to a user's use of the device, such as the location of the device, battery usage, WiFi access, and/or interactions with other devices (e.g., emails, calls, short message service (SMS) messages, multimedia messaging service (MMS) messages, web browsing history, proximity detections, etc.), and store this information in user log files. The user device can construct various grammars based on these log files to aid in determining information about the user, such as behaviors, interests, important locations (e.g., home, work), etc.

SUMMARY

The following presents a simplified summary relating to one or more aspects and/or embodiments associated with the mechanisms disclosed herein to create a time-sensitive grammar. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

A method of creating a time-sensitive grammar includes receiving a plurality of data points, identifying a plurality of time gaps associated with the plurality of data points, each of the plurality of time gaps representing a dwell time or a frequency of occurrence of a data point of the plurality of data points, generating a generic time factor representing a multiple of the plurality of time gaps, and combining the generic time factor with the plurality of data points to create a time-sensitive sequence of data points, wherein the generic time factor is inserted into the time-sensitive sequence a number of times representing the dwell time or the frequency of occurrence of a corresponding data point of the plurality of data points.

An apparatus for creating a time-sensitive grammar includes a processor and a time factor combiner module configured to: receive a plurality of data points, identify a plurality of time gaps associated with the plurality of data points, each of the plurality of time gaps representing a dwell time or a frequency of occurrence of a data point of the plurality of data points, generate a generic time factor representing a multiple of the plurality of time gaps, and combine the generic time factor with the plurality of data points to create a time-sensitive sequence of data points, wherein the generic time factor is inserted into the time-sensitive sequence a number of times representing the dwell time or the frequency of occurrence of a corresponding data point of the plurality of data points.

An apparatus for creating a time-sensitive grammar includes logic configured to receive a plurality of data points, logic configured to identify a plurality of time gaps associated with the plurality of data points, each of the plurality of time gaps representing a dwell time or a frequency of occurrence of a data point of the plurality of data points, logic configured to generate a generic time factor representing a multiple of the plurality of time gaps, and logic configured to combine the generic time factor with the plurality of data points to create a time-sensitive sequence of data points, wherein the generic time factor is inserted into the time-sensitive sequence a number of times representing the dwell time or the frequency of occurrence of a corresponding data point of the plurality of data points.

An apparatus for creating a time-sensitive grammar includes means for receiving a plurality of data points, means for identifying a plurality of time gaps associated with the plurality of data points, each of the plurality of time gaps representing a dwell time or a frequency of occurrence of a data point of the plurality of data points, means for generating a generic time factor representing a multiple of the plurality of time gaps, and means for combining the generic time factor with the plurality of data points to create a time-sensitive sequence of data points, wherein the generic time factor is inserted into the time-sensitive sequence a number of times representing the dwell time or the frequency of occurrence of a corresponding data point of the plurality of data points.

A non-transitory computer-readable medium for creating a time-sensitive grammar includes at least one instruction to receive a plurality of data points, at least one instruction to identify a plurality of time gaps associated with the plurality of data points, each of the plurality of time gaps representing a dwell time or a frequency of occurrence of a data point of the plurality of data points, at least one instruction to generate a generic time factor representing a multiple of the plurality of time gaps, and at least one instruction to combine the generic time factor with the plurality of data points to create a time-sensitive sequence of data points, wherein the generic time factor is inserted into the time-sensitive sequence a number of times representing the dwell time or the frequency of occurrence of a corresponding data point of the plurality of data points.

Other objects and advantages associated with the mechanisms disclosed herein will be apparent to those skilled in the art based on the accompanying drawings and detailed description.

BRIEF DESCRIPTION OF THE DRAWINGS

A more complete appreciation of embodiments of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
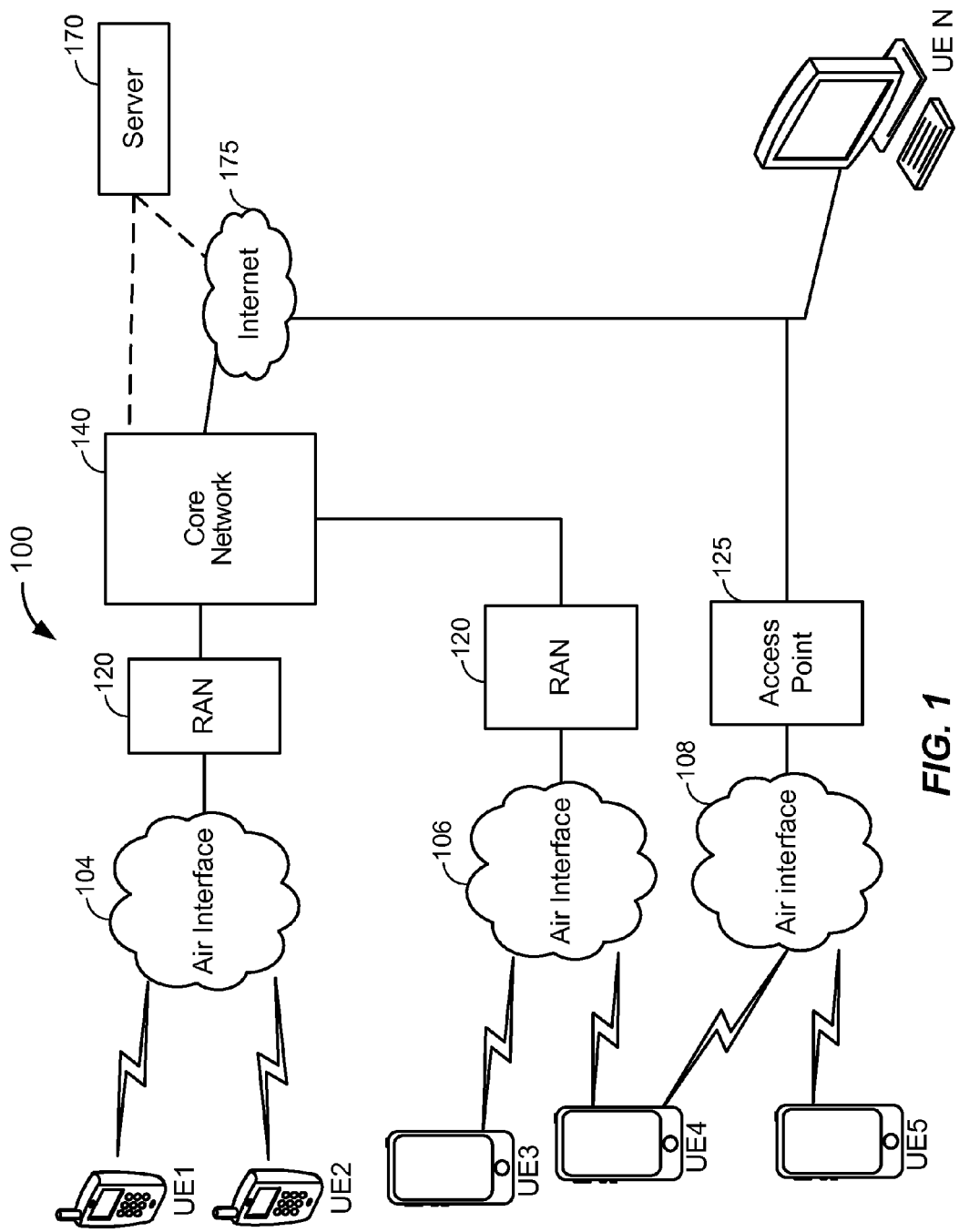
FIG. 1 illustrates a high-level system architecture of a wireless communications system in accordance with an embodiment of the disclosure.

The disclosure relates to creating a time-sensitive grammar. A device receives a plurality of data points, identifies a plurality of time gaps associated with the plurality of data points, each of the plurality of time gaps representing a dwell time or a frequency of occurrence of a data point of the plurality of data points, generates a generic time factor representing a multiple of the plurality of time gaps, and combines the generic time factor with the plurality of data points to create a time-sensitive sequence of data points. The generic time factor may be inserted into the time-sensitive sequence a number of times representing the dwell time or the frequency of occurrence of a corresponding data point of the plurality of data points.

Aspects of the disclosure are disclosed in the following description and related drawings directed to specific embodiments of the disclosure. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the disclosure" does not require that all embodiments of the disclosure include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the disclosure. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, a server 170 is shown as connected to the Internet 175, the core network 140, or both. The server 170 can be implemented as a plurality of structurally separate servers, or alternately may correspond to a single server. As will be described below in more detail, the server 170 is configured to support one or more communication services (e.g., Voice-over-Internet Protocol (VoIP) sessions, Push-to-Talk (PTT) sessions, group communication sessions, social networking services, etc.) for UEs that can connect to the server 170 via the core network 140 and/or the Internet 175, and/or to provide content (e.g., web page downloads) to the UEs.

Figure 2:
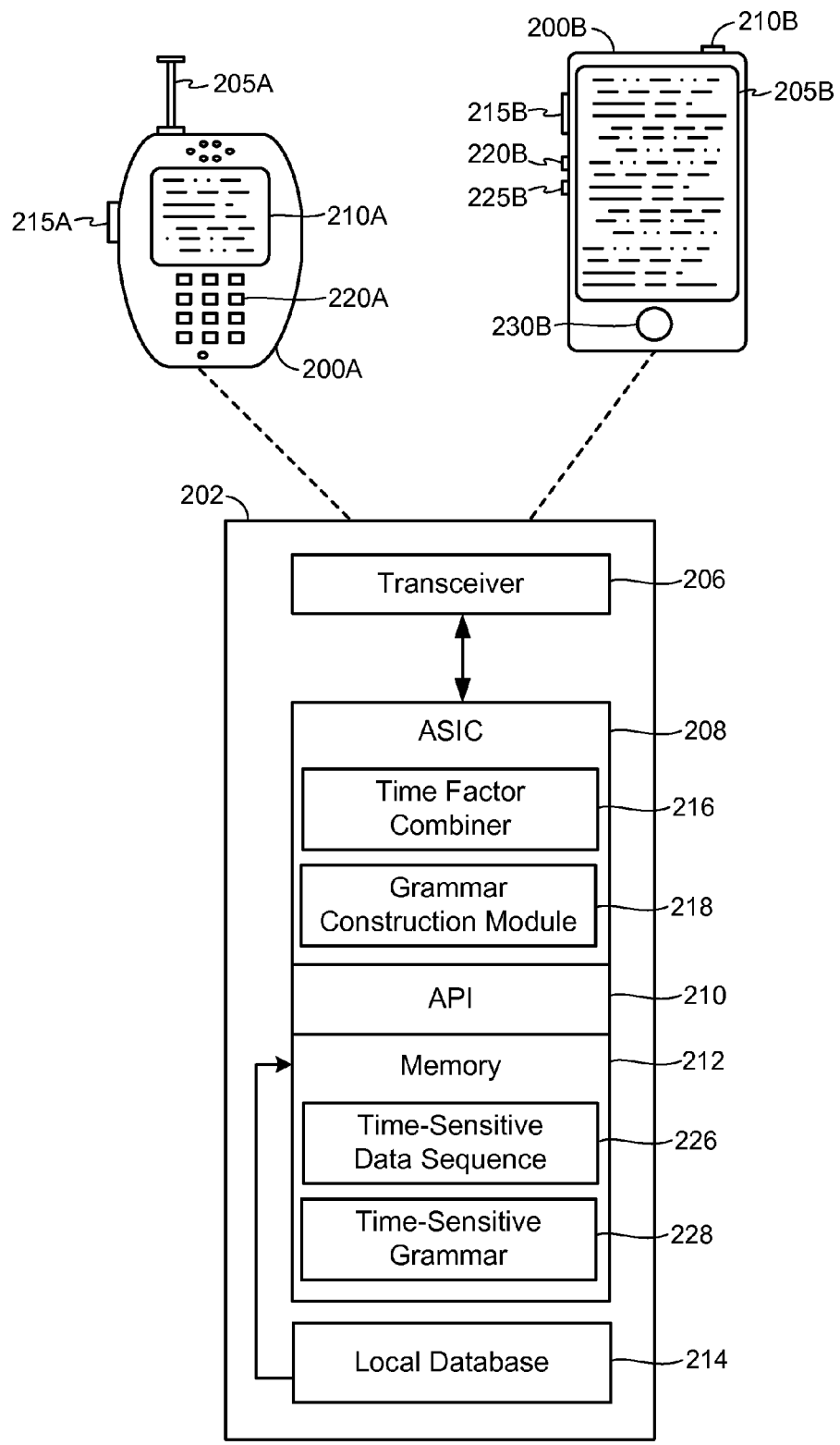
FIG. 2 illustrates examples of user equipments (UEs) in accordance with embodiments of the disclosure.

FIG. 2 illustrates examples of UEs (i.e., client devices) in accordance with embodiments of the disclosure. Referring to FIG. 2, UE 200A is illustrated as a calling telephone and UE 200B is illustrated as a touchscreen device (e.g., a smart phone, a tablet computer, etc.). As shown in FIG. 2, an external casing of UE 200A is configured with an antenna 205A, display 210A, at least one button 215A (e.g., a PTT button, a power button, a volume control button, etc.) and a keypad 220A among other components, as is known in the art. Also, an external casing of UE 200B is configured with a touchscreen display 205B, peripheral buttons 210B, 215B, 220B and 225B (e.g., a power control button, a volume or vibrate control button, an airplane mode toggle button, etc.), at least one front-panel button 230B (e.g., a Home button, etc.), among other components, as is known in the art. While not shown explicitly as part of UE 200B, the UE 200B can include one or more external antennas and/or one or more integrated antennas that are built into the external casing of UE 200B, including but not limited to WiFi antennas, cellular antennas, satellite position system (SPS) antennas (e.g., global positioning system (GPS) antennas), and so on.

While internal components of UEs such as the UEs 200A and 200B can be embodied with different hardware configurations, a basic high-level UE configuration for internal hardware components is shown as platform 202 in FIG. 2. The platform 202 can receive and execute software applications, data and/or commands transmitted from the RAN 120 that may ultimately come from the core network 140, the Internet 175 and/or other remote servers and networks (e.g., application server 170, web URLs, etc.). The platform 202 can also independently execute locally stored applications without RAN interaction. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can store applications not actively used in memory 212, as well as other data. The local database 214 is typically a flash memory cell, but can be any secondary storage device as known in the art, such as magnetic media, EEPROM, optical media, tape, soft or hard disk, or the like. The ASIC 208 may also include time factor combiner 216 and a grammar construction module 218 configured to generate a time-sensitive grammar, as described herein. The time factor combiner 216 and the grammar construction module 218 may be implemented as electronic hardware, computer software, or a combination of both. The memory 212 and/or the local database 214 may store log files that can be processed by time factor combiner 216 and the grammar construction module 218, as described herein. The memory 212 may also store the time-sensitive sequence of data points 226 generated by the time factor combiner 216 and the time-sensitive grammar 228 generated by the grammar construction module 218.

Accordingly, an embodiment of the disclosure can include a UE (e.g., UE 200A, 200B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210, local database 214, time factor combiner 216, and/or grammar construction module 218 may all be used cooperatively to load, store and execute the various functions disclosed herein and thus the logic to perform these functions may be distributed over various elements. Alternatively, the functionality could be incorporated into one discrete component. Therefore, the features of the UEs 200A and 200B in FIG. 2 are to be considered merely illustrative and the disclosure is not limited to the illustrated features or arrangement.

For example, the time factor combiner 216 may receive a plurality of data points (from transceiver 206, memory 212, or local database 214, for example), identify a plurality of time gaps associated with the plurality of data points, each of the plurality of time gaps representing a dwell time or a frequency of occurrence of a data point of the plurality of data points, generate a generic time factor representing a multiple of the plurality of time gaps, and combine the generic time factor with the plurality of data points to create a time-sensitive sequence of data points. The generic time factor may be inserted into the time-sensitive sequence a number of times representing the dwell time or the frequency of occurrence of a corresponding data point of the plurality of data points.

The wireless communication between the UEs 200A and/or 200B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the disclosure and are merely to aid in the description of aspects of embodiments of the disclosure.

Figure 3:
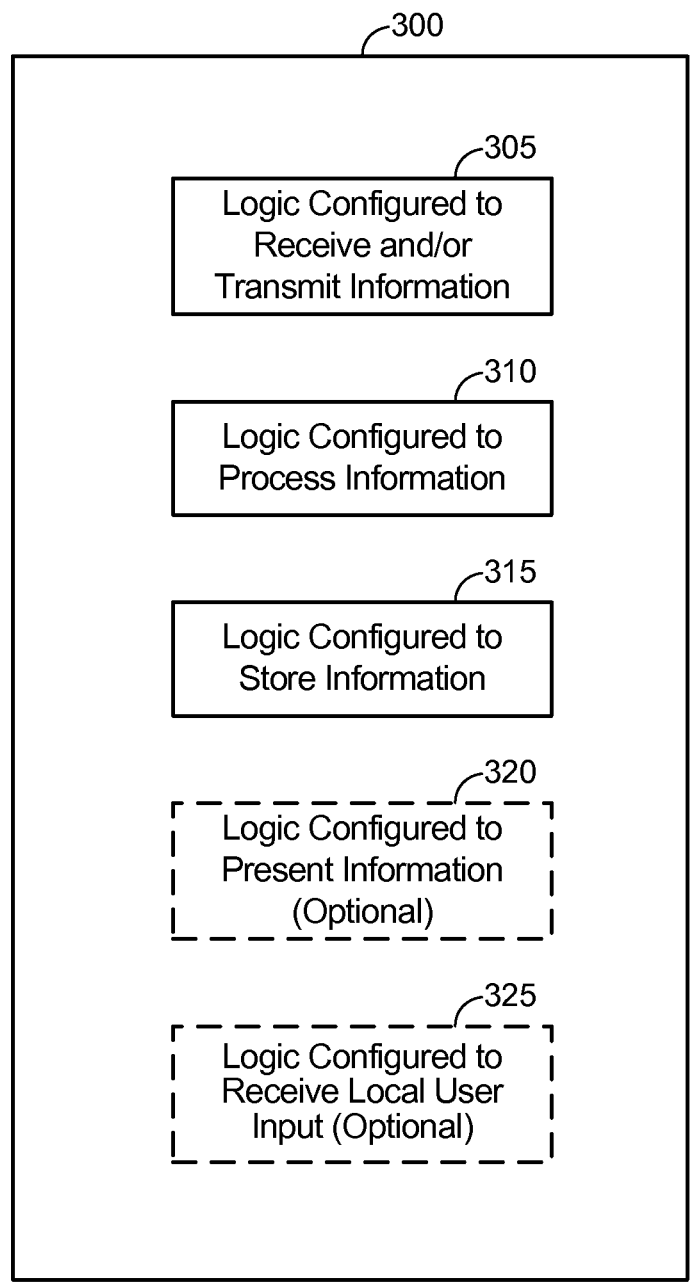
FIG. 3 illustrates a communication device that includes logic configured to perform functionality in accordance with an embodiment of the disclosure.

FIG. 3 illustrates a communication device 300 that includes logic configured to perform functionality. The communication device 300 can correspond to any of the above-noted communication devices, including but not limited to UEs 200A or 200B, any component of the RAN 120, any component of the core network 140, any components coupled with the core network 140 and/or the Internet 175 (e.g., the server 170), and so on. Thus, communication device 300 can correspond to any electronic device that is configured to communicate with (or facilitate communication with) one or more other entities over the wireless communications system 100 of FIG. 1.

Referring to FIG. 3, the communication device 300 includes logic configured to receive and/or transmit information 305. In an example, if the communication device 300 corresponds to a wireless communications device (e.g., UE 200A or 200B, AP 125, a BS, Node B or eNodeB in the RAN 120, etc.), the logic configured to receive and/or transmit information 305 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., server 170, etc.), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the logic configured to process information 310 may include logic configured to receive a plurality of data points, logic configured to identify a plurality of time gaps associated with the plurality of data points, each of the plurality of time gaps representing a dwell time or a frequency of occurrence of a data point of the plurality of data points, logic configured to generate a generic time factor representing a multiple of the plurality of time gaps, and logic configured to combine the generic time factor with the plurality of data points to create a time-sensitive sequence of data points. The processor included in the logic configured to process information 310 can correspond to a digital signal processor (DSP), an ASIC, a field programmable gate array (FPGA) or other programmable logic device, discrete gate or transistor logic, discrete hardware components, or any combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM memory, flash memory, ROM memory, EPROM memory, EEPROM memory, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to UE 200A or UE 200B as shown in FIG. 2, the logic configured to present information 320 can include the display 210A of UE 200A or the touchscreen display 205B of UE 200B. In a further example, the logic configured to present information 320 can be omitted for certain communication devices, such as network communication devices that do not have a local user (e.g., network switches or routers, remote servers such as the server 170, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to UE 200A or UE 200B as shown in FIG. 2, the logic configured to receive local user input 325 can include the keypad 220A, any of the buttons 215A or 210B through 225B, the touchscreen display 205B, etc. In a further example, the logic configured to receive local user input 325 can be omitted for certain communication devices, such as network communication devices that do not have a local user (e.g., network switches or routers, remote servers such as the server 170, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 4:
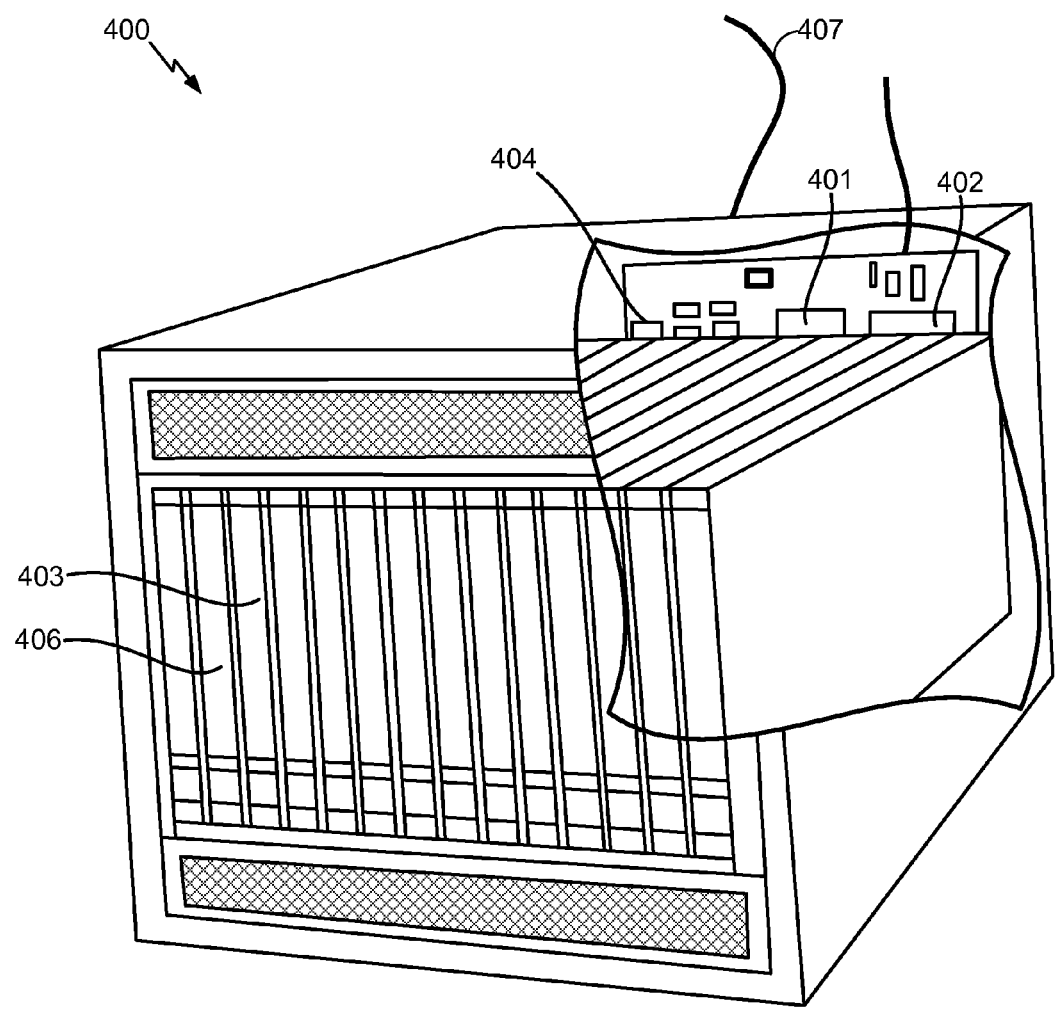
FIG. 4 illustrates a server in accordance with an embodiment of the disclosure.

The various embodiments may be implemented on any of a variety of commercially available server devices, such as server 400 illustrated in FIG. 4. In an example, the server 400 may correspond to one example configuration of the server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. Further, although not illustrated in FIG. 4, the processor 401 may include a time factor combiner and a grammar construction module configured to generate a time-sensitive grammar, as described herein. The volatile memory 402 and/or the disc drive 403 may store log files that can be processed by the time factor combiner and the grammar construction module, as described herein. Server 400 may receive such log files from various user devices via network access ports 404.

In context with FIG. 3, it will be appreciated that the server 400 of FIG. 4 illustrates one example implementation of the communication device 300, whereby the logic configured to transmit and/or receive information 305 corresponds to the network access ports 304 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to a UE implementation as in 200A or 200B in FIG. 2.

User devices, such as UE 200A/200B in FIG. 2, generally track information related to a user's use of the device, such as the location of the device, battery usage, WiFi access, and/or interactions with other devices (e.g., emails, calls, short message service (SMS) messages, multimedia messaging service (MMS) messages, web browsing history, proximity detections, etc.), and store this information in user log files. The user device can construct various grammars based on these log files to aid in determining information about the user, such as behaviors, interests, important locations (e.g., home, work), etc. However, current grammar construction algorithms, such as SEQUITUR, assume a sequential processing of the data, which does not reflect the variations in astronomical time during the acquisition of the data.

For example, a user device, such as user device 200A/200B in FIG. 2, including a grammar construction module, such as grammar construction module 218 in FIG. 2, may initially cluster the data in its various data logs. For example, the user device may cluster a given log around Location (e.g., country) and Application (e.g., McDonalds, Starbucks, etc.). Second, the user device may present the data in each log sequentially, as it matches the clusters, and in the order it is found in the log file. Third, the user device may either group the logs into their representative centroids and find the users that correlate to those entries, or group the logs by users and present the centroids that represent those log entries. Fourth, the user device may generate a grammar for either the groupings of representative centroids or the groupings of users.

It would be beneficial to find a way of representing time granularity within a grammar. For example, when a user device builds a grammar, the sequence of the data is well represented, but there is no way of measuring whether the space between consecutive events is larger or smaller. As a result, an hour and a full day are represented equivalently. It would therefore be useful to find a way to differentiate between these two very different time spans.

Accordingly, an embodiment of the disclosure provides a mechanism whereby a user device, such as UE 200A/200B, can create a time-sensitive grammar. In an aspect, the data in a log file can be padded (e.g., logarithmically), such that events that occur at longer frequencies will have more "padding" than events that occur at shorter frequencies. The user device 200A/200B, or more specifically the time factor combiner 216, can determine the largest and smallest frequencies and create a generic time factor based on those frequencies. The time factor combiner 216 can then generate a sequence of data points by combining this generic time factor with the data points in the log file proportionally to the length of time between the data points. The grammar construction module 218 can then generate a time-sensitive grammar based on this combined sequence of data points.

For example, given a first event followed by a second event two minutes later, as well as two events separated by 12 minutes, the time scale could be 10 minutes, minus the offset of two minutes. Thus, all events that are separated by two minutes will have no padding, and all the events that are separated by 10 minutes will have maximum padding.

Figure 5A:
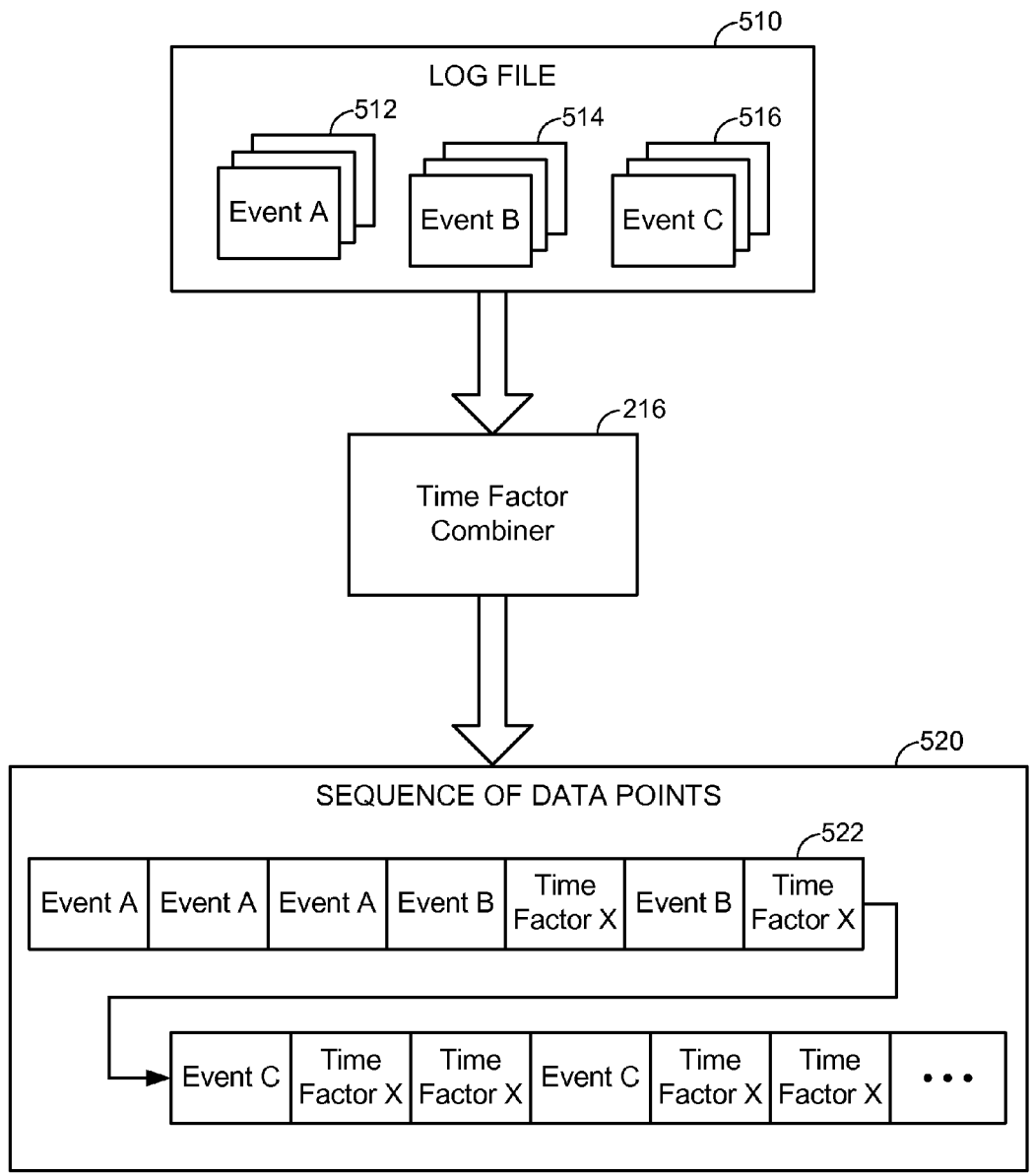
FIG. 5A illustrates an example of combining a generic time factor with data points from a log file according to an embodiment of the disclosure.

FIG. 5A illustrates an example of combining a generic time factor with data points from a log file according to an aspect of the disclosure. As illustrated in FIG. 5A, a log file 510 may include events of type A 512, events of type B 514, and events of type C 516. In the example of FIG. 5A, events of type A 512 occur every two minutes, events of type B 514 occur every 12 minutes, and events of type C 516 occur every 120 minutes. Based on these frequencies, time factor combiner 216 generates a generic time factor X 522. The generic time factor X 522 may be a logarithmic time factor, such that events of type A 512 (which occur every two minutes) are not followed by time factor X 522, events of type B 514 (which occur every 12 minutes) are followed by one time factor X, and events of type C 516 (which occur every 120 minutes) are followed by two time factor X's 522.

Time factor combiner 216 combines the generic time factor X 522 with the data points from log file 510 to generate a sequence of data points 520. As illustrated in FIG. 2, the sequence of data points 520 may then be stored in memory, such as memory 212, for further processing, as described below. In the example of FIG. 5A, the sequence of data points 520 is "AAABXBXCXXCXX." This sequence indicates the order that these data points were recorded in the log file 510. That is, three events of type A 512 were recorded, then two events of type B 514 were recorded, then two events of type C 516 were recorded. Although FIG. 5A illustrates events of type A 512 being recorded before events of type B 514 and events of type B 514 being recorded before events of type C 516, the events may be recorded in any order. For example, events of type B 514 may be recorded before events of type A 510, events of type C 516 may be recorded before events of type B 514, etc.

Figure 5B:
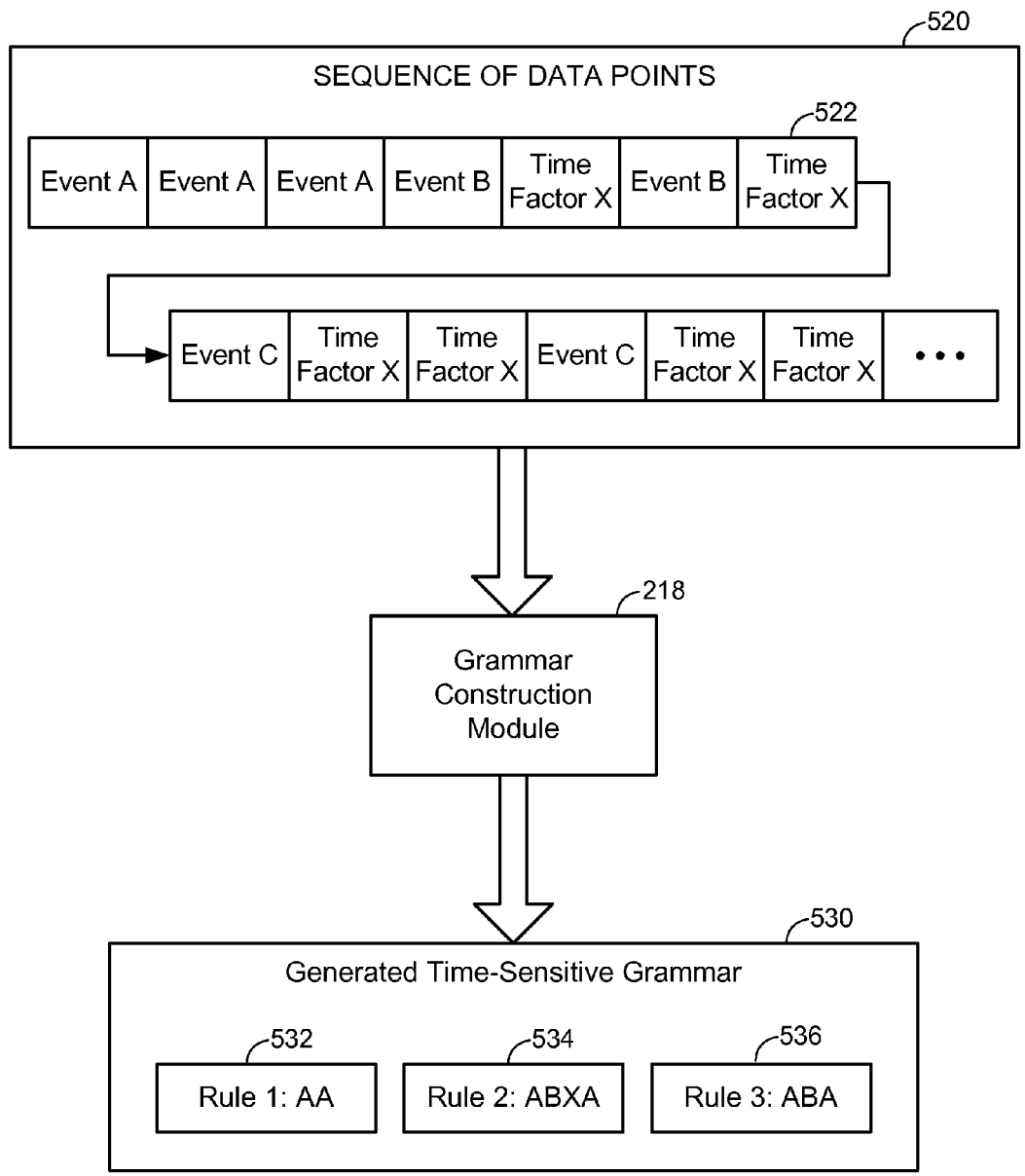
FIG. 5B illustrates an example of generating a time-sensitive grammar based on the sequence of data points generated in FIG. 5A according to an embodiment of the disclosure.

Based on the sequence of data points 520, the grammar construction module 218 can then generate a time-sensitive grammar 530 that will be both time-sensitive and sequentially-sensitive, as illustrated in FIG. 5B. The grammar construction module 218 may be configured to implement a grammar construction algorithm, such as the SEQUITUR algorithm. In the example of FIG. 5B, the grammar construction module 218 may generate the following grammars (also referred to herein as "rules") by executing the grammar construction algorithm: Rule 1 532 ("AA"), Rule 2 534 ("ABXA"), and Rule 3 536 ("ABA"). Note that Rule 2 534 is different than Rule 3 536. As can be appreciated, even though "X" is not existent in the lexicon of the input, it reflects the time elements of the input. As illustrated in FIG. 2, the generated time-sensitive grammar 530 may then be stored in memory, such as memory 212, for further processing, as described below.

In another embodiment, the time-sensitive processing may be shifted into the grammar construction rules, and thereby performed by the grammar construction module 218, as opposed to the one described above in which the time-sensitive processing is addressed through a pre-processing step performed by the time factor combiner 216 before the time-sensitive grammar is constructed by the grammar construction module 218.

Figure 6:
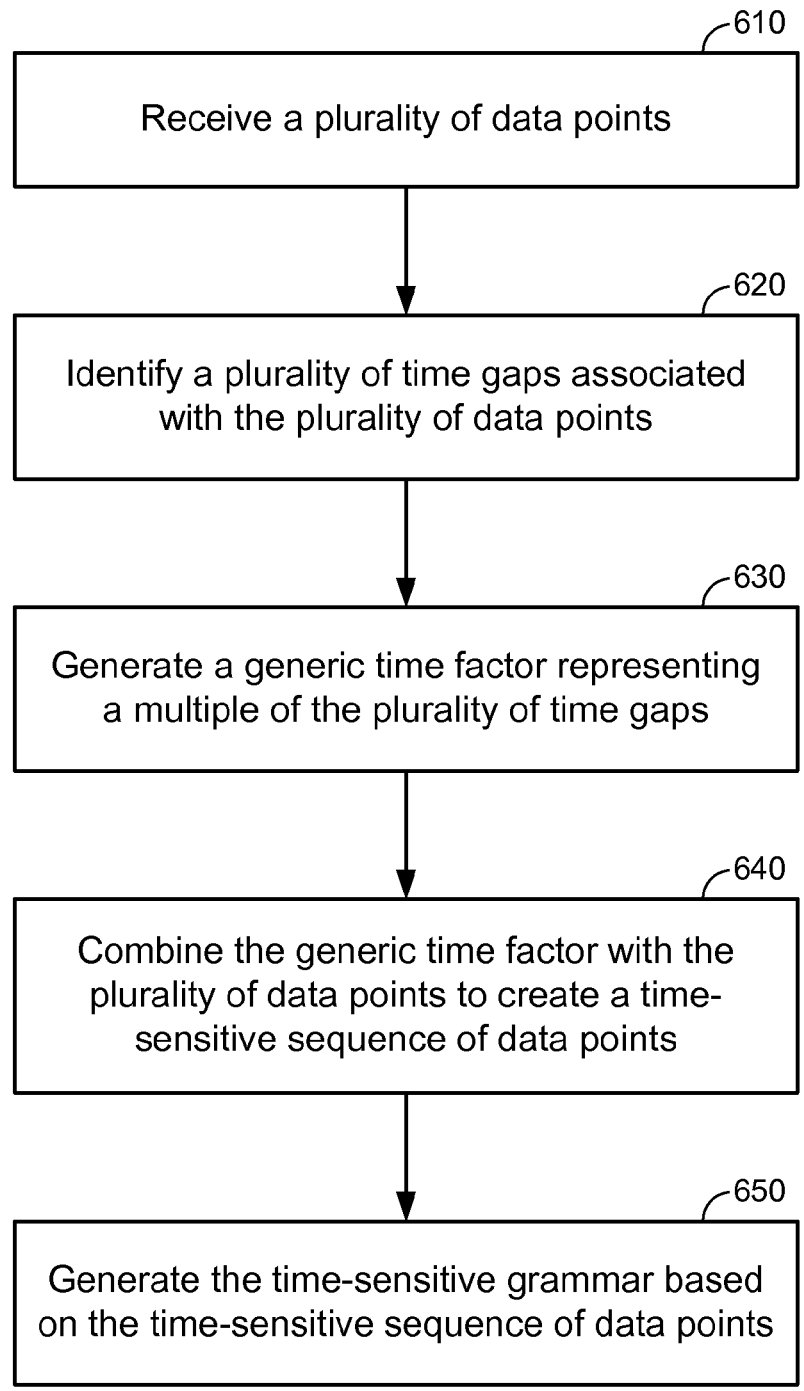
FIG. 6 illustrates an exemplary flow for creating a time-sensitive grammar according to an embodiment of the disclosure.

FIG. 6 illustrates an exemplary flow for creating a time-sensitive grammar. The flow illustrated in FIG. 6 may be performed by a user device, such as UE 200A/200B in FIG. 2 or a server, such as server 400 in FIG. 4. Specifically, a time factor combiner, such as time factor combiner 216, and/or a grammar construction module, such as grammar construction module 218, may perform the flow illustrated in FIG. 6.

At 610, the device receives a plurality of data points. The receiving may include receiving the plurality of data points from one or more log files representing activity of one or more users, such as one or more users of one or more user devices. The plurality of data points may comprise notification data from such one or more user devices. Alternatively, the plurality of data points may comprise microphone data from a user device. A data point may represent an event, and an event may include a location and an activity.

In an aspect, where a user device is performing the flow illustrated in FIG. 6, the user device may be generating the plurality of data points received at 610. Alternatively, where a server is performing the flow illustrated in FIG. 6, the server may be receiving the plurality of data points at 610 from one or more user devices generating the plurality of data points. In yet another alternative, where a user device is performing the flow illustrated in FIG. 6, the user device may be receiving the plurality of data points at 610 from one or more other user devices that are generating the plurality of data points.

At 620, the device identifies a plurality of time gaps associated with the plurality of data points. Each of the plurality of time gaps may represent a dwell time or a frequency of occurrence of a data point of the plurality of data points. The dwell time may be a time period during which a user device is at a location or during which the user device performs an activity. The frequency of occurrence may be a time period between which a user device is at a location or between which the user device performs an activity.

At 630, the device generates a generic time factor representing a multiple of the plurality of time gaps. Generating the generic time factor may include normalizing the plurality of time gaps into a normalized time gap, the normalized time gap representing a multiple of the plurality of time gaps, the generic time factor corresponding to the normalized time gap. Normalizing the plurality of time gaps may include one of a linear normalization, a non-linear normalization, or a logarithmic normalization.

At 640, the device combines the generic time factor with the plurality of data points to create a time-sensitive sequence of data points, wherein the generic time factor is inserted into the time-sensitive sequence a number of times representing the dwell time or the frequency of occurrence of a corresponding data point of the plurality of data points.

At 650, the device generates the time-sensitive grammar based on the time-sensitive sequence of data points. The generated time-sensitive grammar can then be shared among devices. For example, where a user device is performing the flow of FIG. 6, the user device may send the generated time-sensitive grammar to a server and/or to other user devices. Where a server is performing the flow illustrated in FIG. 6, the server may send the generated time-sensitive grammar to the user devices from which the server received the plurality of data points at 610. Alternatively, or additionally, the server may send the generated-time sensitive grammar to one or more other servers for further processing, for example, or to one or more other user devices from which the server did not receive the plurality of data points.

In an aspect, the identifying at 620, the generating at 630, and the combining at 640 may be part of generating the time-sensitive grammar. Alternatively, the identifying at 620, the generating at 630, and the combining at 640 may be performed as a pre-processing of the plurality of data points before the time-sensitive grammar is generated.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 7:
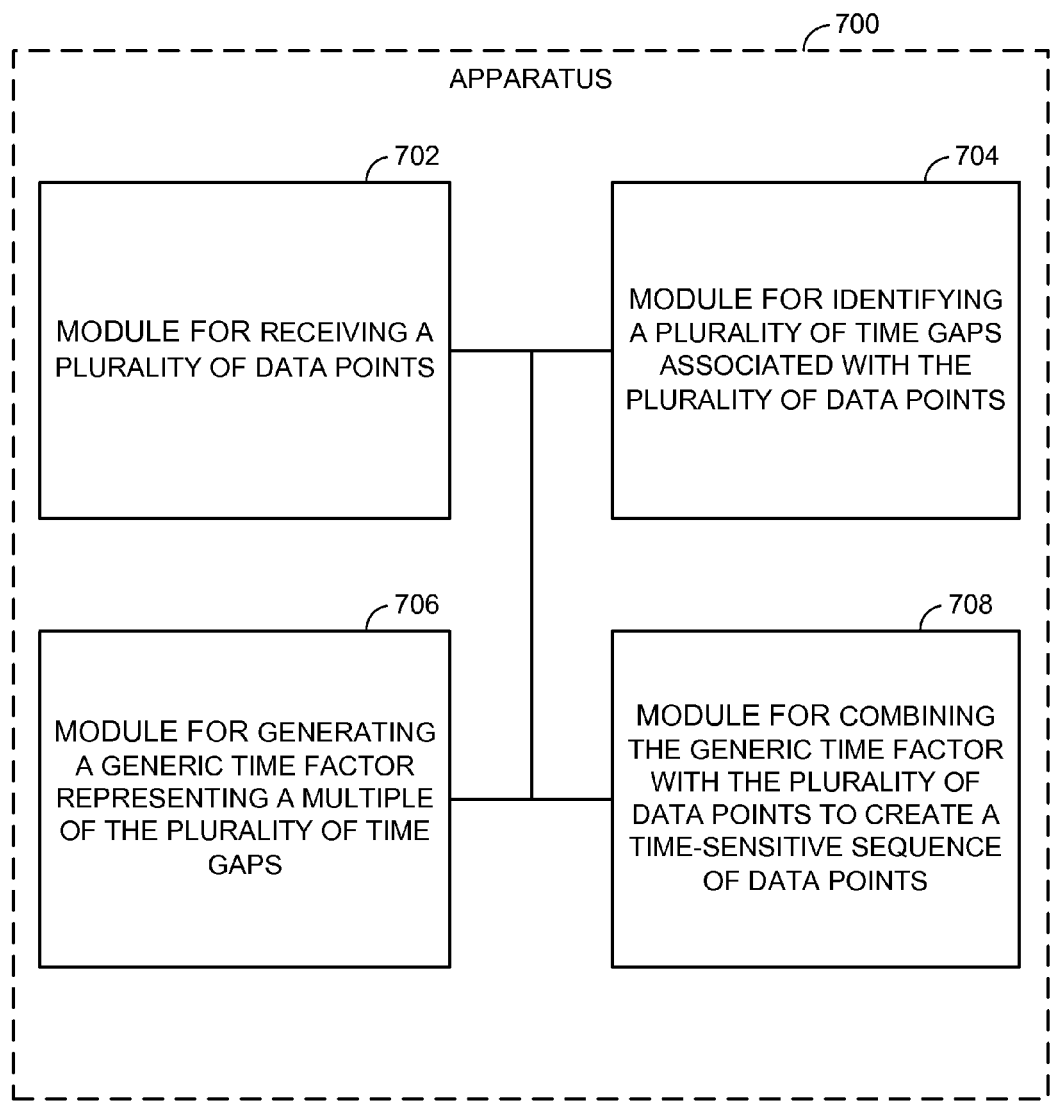
FIG. 7 is a simplified block diagram of several sample aspects of an apparatus configured to support communication as taught herein.

FIG. 7 illustrates an example apparatus 700 represented as a series of interrelated functional modules. The apparatus 700 may correspond to a user device apparatus, such as UE 200A/200B in FIG. 2, or a server apparatus, such as server 400 in FIG. 4. A module for receiving 702 may correspond at least in some aspects to, for example, a processing system, such as ASIC 208 in FIG. 2 or processor 401 in FIG. 4, including a time factor combiner, such as time factor combiner 216 in FIG. 2, as discussed herein. A module for identifying 704 may also correspond at least in some aspects to, for example, a processing system including a time factor combiner as discussed herein. Likewise, a module for generating 706 may correspond at least in some aspects to, for example, a processing system including a time factor combiner as discussed herein. Finally, a module for combining 708 may correspond at least in some aspects to, for example, a processing system including a time factor combiner as discussed herein.

The functionality of the modules of FIG. 7 may be implemented in various ways consistent with the teachings herein. In some designs, the functionality of these modules may be implemented as one or more electrical components. In some designs, the functionality of these blocks may be implemented as a processing system including one or more processor components, such as a time factor combiner and/or a grammar construction module. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 7, as well as other components and functions described herein, may be implemented using any suitable means. Such means also may be implemented, at least in part, using corresponding structure as taught herein. For example, the components described above in conjunction with the "module for" components of FIG. 7 also may correspond to similarly designated "means for" functionality. Thus, in some aspects one or more of such means may be implemented using one or more of processor components, integrated circuits, or other suitable structure as taught herein.

While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method of creating a time-sensitive grammar, comprising:
    receiving, at a device, a plurality of data points generated by at least one user device;
    identifying, by the device, a plurality of time gaps associated with the plurality of data points, each of the plurality of time gaps representing a dwell time or a frequency of occurrence of a data point of the plurality of data points;
    generating, by the device, a generic time factor representing a multiple of the plurality of time gaps;
    combining, by the device, the generic time factor with the plurality of data points to create a time-sensitive sequence of data points, wherein the generic time factor is inserted into the time-sensitive sequence of data points a number of times representing the dwell time or the frequency of occurrence of a corresponding data point of the plurality of data points; and
    storing, by the device, the time-sensitive sequence of data points in a memory of the device.

2. The method of claim 1, wherein the receiving comprises:
    receiving the plurality of data points from one or more log files representing activity of one or more users.

3. The method of claim 1, wherein the plurality of data points comprise notification data from the at least one user device.

4. The method of claim 1, wherein the plurality of data points comprise microphone data from the at least one user device.

5. The method of claim 1, wherein the generating comprises:
    normalizing the plurality of time gaps into a normalized time gap, the normalized time gap representing a multiple of the plurality of time gaps, the generic time factor corresponding to the normalized time gap.

6. The method of claim 5, wherein normalizing the plurality of time gaps comprises one of a linear normalization, a non-linear normalization, or a logarithmic normalization.

7. The method of claim 1, further comprising:
    generating the time-sensitive grammar based on the time-sensitive sequence of data points.

8. The method of claim 1, wherein the identifying, generating, and combining are part of generating the time-sensitive grammar.

9. The method of claim 1, wherein the identifying, generating, and combining are performed as a pre-processing of the plurality of data points before the time-sensitive grammar is generated.

10. The method of claim 1, wherein a data point of the plurality of data points represents an event, and wherein the event comprises a location and an activity.

11. The method of claim 1, wherein the dwell time comprises a time period during which the at least one user device is at a location or during which the at least one user device performs an activity.

12. The method of claim 1, wherein the frequency of occurrence comprises a time period between which the at least one user device is at a location or between which the at least one user device performs an activity.

13. The method of claim 1, wherein the device comprises the at least one user device generating the plurality of data points.

14. The method of claim 1, wherein the device comprises a server.

15. The method of claim 1, wherein the device comprises a user device, and wherein the at least one user device comprises one or more other user devices that generated the plurality of data points.

16. An apparatus for creating a time-sensitive grammar, comprising:
    a processor;
    a time factor combiner module configured to:
        receive a plurality of data points generated by at least one user device;
        identify a plurality of time gaps associated with the plurality of data points, each of the plurality of time gaps representing a dwell time or a frequency of occurrence of a data point of the plurality of data points;
        generate a generic time factor representing a multiple of the plurality of time gaps; and
        combine the generic time factor with the plurality of data points to create a time-sensitive sequence of data points, wherein the generic time factor is inserted into the time-sensitive sequence a number of times representing the dwell time or the frequency of occurrence of a corresponding data point of the plurality of data points; and
    a memory configured to store the time-sensitive sequence of data points in a memory of the device.

17. The apparatus of claim 16, wherein the time factor combiner module being configured to receive comprises the time factor combiner module being configured to receive the plurality of data points from one or more log files representing activity of one or more users.

18. The apparatus of claim 16, wherein the plurality of data points comprise notification data from the at least one user device.

19. The apparatus of claim 16, wherein the plurality of data points comprise microphone data from the at least one user device.

20. The apparatus of claim 16, wherein the time factor combiner module being configured to generate comprises the time factor combiner module being configured to normalize the plurality of time gaps into a normalized time gap, the normalized time gap representing a multiple of the plurality of time gaps, the generic time factor corresponding to the normalized time gap.

21. The apparatus of claim 20, wherein normalization of the plurality of time gaps comprises one of a linear normalization, a non-linear normalization, or a logarithmic normalization.

22. The apparatus of claim 16, wherein the apparatus further comprises:
    a grammar construction module configured to generate the time-sensitive grammar based on the time-sensitive sequence of data points.

23. The apparatus of claim 16, wherein a data point of the plurality of data points represents an event, and wherein the event comprises a location and an activity.

24. The apparatus of claim 16, wherein the dwell time comprises a time period during which the at least one user device is at a location or during which the at least one user device performs an activity.

25. The apparatus of claim 16, wherein the frequency of occurrence comprises a time period between which the at least one user device is at a location or between which the at least one user device performs an activity.

26. The apparatus of claim 16, wherein the apparatus comprises the at least one user device.

27. The apparatus of claim 16, wherein the apparatus comprises a server.

28. The apparatus of claim 16, wherein the apparatus comprises a user device, and wherein the at least one user device comprises one or more other user devices that generated the plurality of data points.

29. An apparatus for creating a time-sensitive grammar, comprising:
    means for receiving a plurality of data points generated by at least one user device;
    means for identifying a plurality of time gaps associated with the plurality of data points, each of the plurality of time gaps representing a dwell time or a frequency of occurrence of a data point of the plurality of data points;
    means for generating a generic time factor representing a multiple of the plurality of time gaps;
    means for combining the generic time factor with the plurality of data points to create a time-sensitive sequence of data points, wherein the generic time factor is inserted into the time-sensitive sequence a number of times representing the dwell time or the frequency of occurrence of a corresponding data point of the plurality of data points; and
    means for storing the time-sensitive sequence of data points in a memory of the device.

30. A non-transitory computer-readable medium for creating a time-sensitive grammar, comprising:
    at least one instruction to cause a device to receive a plurality of data points generated by at least one user device;
    at least one instruction to cause the device to identify a plurality of time gaps associated with the plurality of data points, each of the plurality of time gaps representing a dwell time or a frequency of occurrence of a data point of the plurality of data points;
    at least one instruction to cause the device to generate a generic time factor representing a multiple of the plurality of time gaps; and
    at least one instruction to cause the device to combine the generic time factor with the plurality of data points to create a time-sensitive sequence of data points, wherein the generic time factor is inserted into the time-sensitive sequence a number of times representing the dwell time or the frequency of occurrence of a corresponding data point of the plurality of data points; and
    at least one instruction to cause the device to store the time-sensitive sequence of data points in a memory of the device.

* * * * *